(12) United States Patent
McIntyre et al.

(10) Patent No.: US 7,583,833 B2
(45) Date of Patent: Sep. 1, 2009

(54) METHOD AND APPARATUS FOR MANUFACTURING DATA INDEXING

(75) Inventors: Michael G. McIntyre, Austin, TX (US); Alex Bierwag, Austin, TX (US); Charlie Reading, Austin, TX (US); Alfredo V. Herrera, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 497 days.

(21) Appl. No.: 11/341,701

(22) Filed: Jan. 27, 2006

(65) Prior Publication Data

US 2007/0179663 A1 Aug. 2, 2007

(51) Int. Cl.
*G06K 9/00* (2006.01)
*G06K 9/62* (2006.01)
*G01N 21/00* (2006.01)
*G01R 31/02* (2006.01)
*G06F 19/00* (2006.01)
*G06F 11/30* (2006.01)
*G21C 17/00* (2006.01)
*G06F 7/00* (2006.01)
*G06F 17/30* (2006.01)

(52) U.S. Cl. ............. 382/149; 382/147; 382/181; 382/224; 356/237.4; 324/537; 700/110; 700/121; 702/185; 707/6; 707/7; 707/101

(58) Field of Classification Search ............. 707/3–7, 707/100, 101; 702/179, 182, 183, 181, 185; 700/108, 109, 110, 121; 382/141, 145, 147, 382/149, 181, 218, 220, 222, 224, 225, 100; 356/237.1, 237.2, 237.5, 601, 237.4; 324/500, 324/537, 765

See application file for complete search history.

(56) References Cited

U.S. PATENT DOCUMENTS

| | | | | |
|---|---|---|---|---|
| 4,461,575 A | * | 7/1984 | Miller et al. | 356/639 |
| 4,651,341 A | * | 3/1987 | Nakashima et al. | 382/222 |
| 4,854,707 A | * | 8/1989 | Ring et al. | 356/496 |
| 5,737,330 A | * | 4/1998 | Fulthorp et al. | 370/346 |
| 5,787,190 A | * | 7/1998 | Peng et al. | 382/145 |

(Continued)

FOREIGN PATENT DOCUMENTS

JP 2004045145 A * 2/2004

(Continued)

OTHER PUBLICATIONS

PCT Search Report for International Application No. PCT/US2007/001870.

*Primary Examiner*—Crystal J Barnes-Bullock
(74) *Attorney, Agent, or Firm*—Williams, Morgan & Amerson, P.C.

(57) ABSTRACT

A method, apparatus, and a system for generating an index for storing data. A pattern associated with a first set of data is determined. The first set of data is stored. A determination is made as to whether the pattern associated with a second set of data corresponds to the pattern associated with the first set of data. An index associated with the first set of data is correlated to the second set of data in response to determining that the pattern associated with the second set of data corresponds to the pattern associated with the first set of data.

34 Claims, 10 Drawing Sheets

U.S. PATENT DOCUMENTS

| | | | |
|---|---|---|---|
| 5,900,941 A * | 5/1999 | Matsuyama et al. | 356/394 |
| 6,122,575 A * | 9/2000 | Schmidt et al. | 701/29 |
| 6,137,303 A * | 10/2000 | Deckert et al. | 324/765 |
| 6,148,099 A * | 11/2000 | Lee et al. | 382/149 |
| 6,202,037 B1 * | 3/2001 | Hattori et al. | 702/182 |
| 6,522,790 B1 * | 2/2003 | Zhang et al. | 382/284 |
| 6,650,422 B2 * | 11/2003 | Singh et al. | 356/601 |
| 6,825,487 B2 * | 11/2004 | Preece | 250/559.4 |
| 6,885,977 B2 * | 4/2005 | Gavra et al. | 702/185 |
| 6,904,384 B2 * | 6/2005 | Tai | 702/179 |
| 6,909,930 B2 * | 6/2005 | Shishido et al. | 700/121 |
| 7,010,382 B2 * | 3/2006 | Cheng et al. | 700/121 |
| 7,034,930 B1 * | 4/2006 | Subramanian et al. | 356/237.2 |
| 7,216,311 B2 * | 5/2007 | Tanaka et al. | 716/4 |
| 7,221,991 B2 * | 5/2007 | Matsushita et al. | 700/110 |
| 7,424,130 B2 * | 9/2008 | Kondo et al. | 382/100 |
| 7,447,610 B2 * | 11/2008 | Wang | 702/181 |
| 2004/0049722 A1 | 3/2004 | Matsushita | |
| 2005/0194590 A1 | 9/2005 | Matsushita et al. | |

FOREIGN PATENT DOCUMENTS

JP   2004165866 A  *  6/2004

* cited by examiner

Nth Wafer

First Wafer

Wafer-level Failure Pattern

FIGURE 5

FIGURE 6
Lot-level Failure Patterns

METHOD AND APPARATUS FOR MANUFACTURING DATA INDEXING

BACKGROUND OF THE INVENTION

1. Field of the Invention

This invention relates generally to semiconductor manufacturing, and, more particularly, to a method and apparatus for indexing manufacturing data for improving efficiency of data storage and/or data retrieval.

2. Description of the Related Art

The technology explosion in the manufacturing industry has resulted in many new and innovative manufacturing processes. Today's manufacturing processes, particularly semiconductor manufacturing processes, call for a large number of important steps. These process steps are usually vital and, therefore, require a number of inputs that are generally fine-tuned to maintaining proper manufacturing control. The manufacture of semiconductor devices requires a number of discrete process steps to create a packaged semiconductor device from raw semiconductor material. The various processes, from the initial growth of the semiconductor material, the slicing of the semiconductor crystal into individual wafers, the fabrication stages (etching, doping, ion implanting, or the like), to the packaging and final testing of the completed device, are so different from one another and specialized that the processes may be performed in different manufacturing locations that contain different control schemes.

Generally, a set of processing steps is performed across a group of semiconductor wafers, sometimes referred to as a lot. For example, a process layer that may be composed of a variety of different materials may be formed across a semiconductor wafer. Thereafter, a patterned layer of photoresist may be formed across the process layer using known photolithography techniques. Typically, an etch process is then performed across the process layer using a patterned layer of photoresist as a mask. This etching process results in the formation of various features or objects in the process layer. Such features may be used as, for example, a gate electrode structure for transistors. Many times, trench isolation structures are also formed across the substrate of the semiconductor wafer to isolate electrical areas across a semiconductor wafer. One example of an isolation structure that can be used is a shallow trench isolation (STI) structure.

The manufacturing tools within a semiconductor manufacturing facility typically communicate with a manufacturing framework or a network of processing modules. Each manufacturing tool is generally connected to an equipment interface. The equipment interface is connected to a machine interface to which a manufacturing network is connected, thereby facilitating communications between the manufacturing tool and the manufacturing framework. The machine interface can generally be part of an advanced process control (APC) system. The APC system initiates a control script, which can be a software program that automatically retrieves the data needed to execute a specific manufacturing process.

Figure 1:
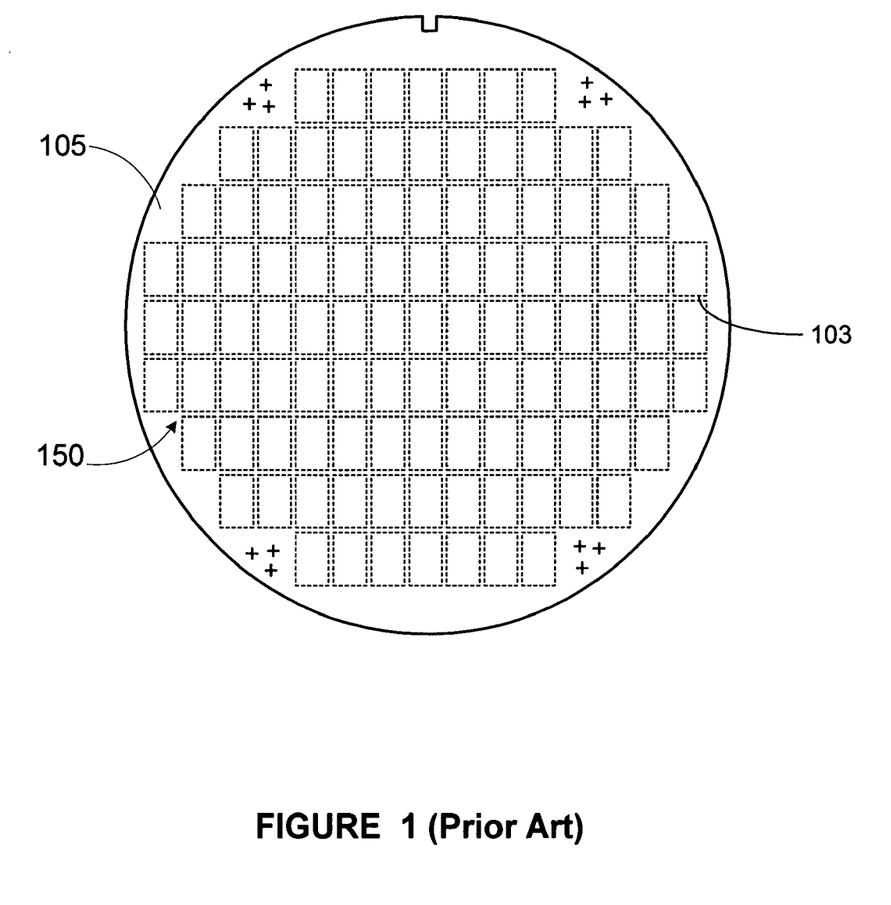
FIG. 1 illustrates a stylized depiction of a semiconductor wafer that may be processed by a semiconductor manufacturing system.

FIG. 1 illustrates a typical semiconductor wafer 105. The semiconductor wafer 105 typically includes a plurality of individual semiconductor die 103 arranged in a grid 150. Using known photolithography processes and equipment, a patterned layer of photoresist may be formed across one or more process layers that are to be patterned. As part of the photolithography process, an exposure process is typically performed by a stepper on single or multiple die 103 locations at a time, depending on the specific photomask employed. The patterned photoresist layer can be used as a mask during etching processes, wet or dry, performed on the underlying layer or layers of material, e.g., a layer of polysilicon, metal or insulating material, to transfer the desired pattern to the underlying layer. The patterned layer of photoresist is comprised of a plurality of features, e.g., line-type features or opening-type features that are to be replicated in an underlying process layer.

When processing wafers, a large amount of metrology data and/or test data relating to various portions of a processed wafer is acquired. Data relating to metrology analysis or the testing of portions of the wafer are stored into large databases. These databases may accumulate large amounts of data that has to be processed and organized for later retrieval. Often, upon acquiring significant amount of manufacturing data, prohibitively large amounts of data may be available for storage and retrieval.

Figure 2:
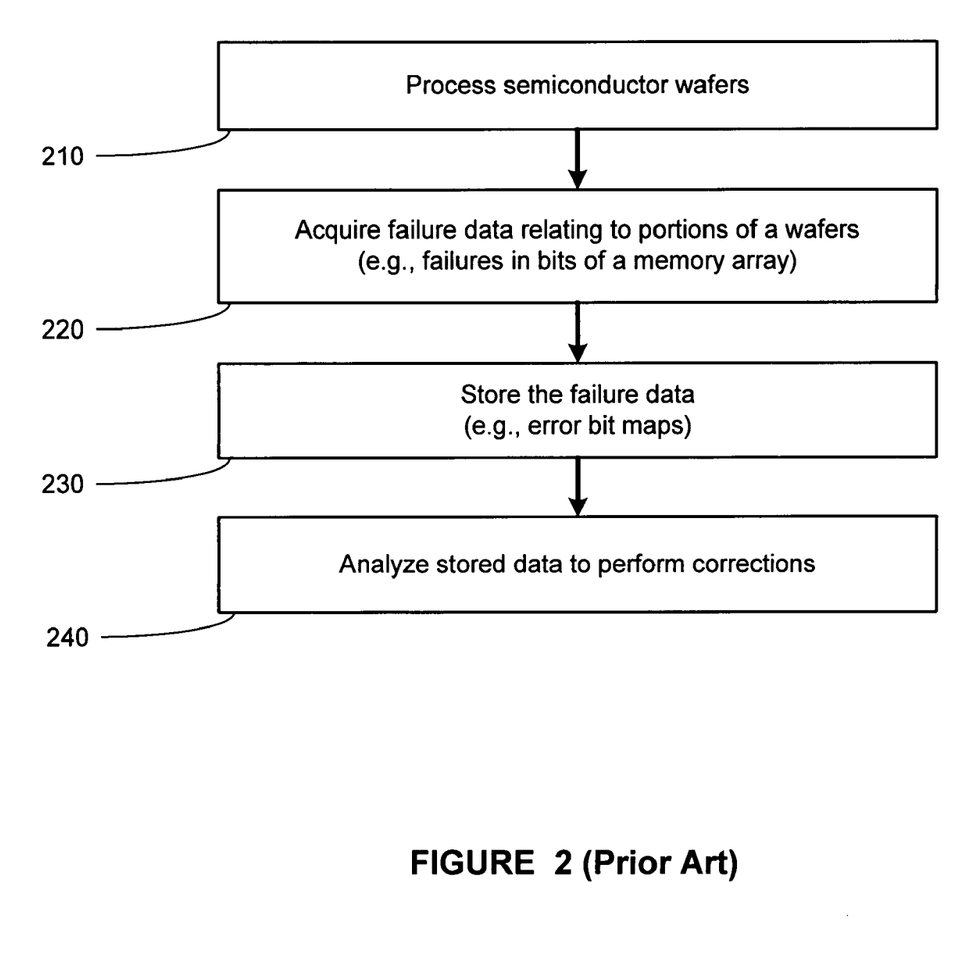
FIG. 2 illustrates a flowchart depiction of a prior art method for processing semiconductor wafers.

Referring now to FIG. 2, a flowchart depiction of a typical prior art process flow is illustrated. A manufacturing system may process a batch of wafers in a lot (block 210). Manufacturing data relating to portions of the wafers e.g., metrology data or testing results, is generally acquired (block 220). For example, data relating to various bits in a memory array may be acquired, wherein the data may be indicative of whether a particular bit in a memory array is operational or at failure. The system may then store large bit maps of failure data (block 230). Large databases are generally used to store the data relating to the bitmap or other types of failures. The manufacturing system may then analyze the stored data to perform corrections for subsequent processes of semiconductor wafers 105 (block 240).

Among the problems associated with the current methodology includes the requirement of storing large amounts of data, which prompts the usage of considerable computing resources and time. The exact coordinates of failing bits in a memory device array or failing regions in a die is generally important in performing failure analysis. The coordinates of the failing bits or die regions are also important in performing yield analysis during manufacturing. Therefore, failure data relating to each of the failed bits or die regions are meticulously stored and organized for later retrieval. Therefore, even for a relatively small scale manufacturing line, the storage and organization of failing bits may become a massive task. Retrieving the data may also require significant computing resources and processing time. Therefore, corrections of subsequent processes may be delayed by the time period required for retrieving and analyzing data stored in massive databases. Additionally, considerable resources are used in the manufacturing system to store, organize, and track the failure data.

The present invention is directed to overcoming, or at least reducing, the effects of one or more of the problems set forth above.

SUMMARY OF THE INVENTION

In one aspect of the present invention, a method is provided for generating an index for storing data. The first set of data is stored. A determination is made as to whether the pattern associated with a second set of data corresponds to the pattern associated with the first set of data. An index associated with the first set of data is correlated to the second set of data in response to determining that the pattern associated with the second set of data corresponds to the pattern associated with the first set of data.

In another aspect of the present invention, a method is provided for generating an index for storing data. Manufacturing data relating to a first portion of a work piece is received. A failure pattern associated with the data relating to the first portion of the work piece is determined. The data relating to the first portion of the work piece is stored. An index associated with the data relating to the first portion of the work piece is provided. Manufacturing data relating to a second portion of the work piece is received. A determination is made as to whether the failure pattern associated with the data relating to the second portion of the work piece corresponds to the failure pattern associated with the data relating to the first portion of the work piece. The index relating to the data relating to the first portion of the work piece is associated to the data relating to the first portion of the work piece. The association is based upon a determination that the failure pattern associated with the second portion of the work piece corresponds to the failure pattern associated with the first portion of the work piece.

In another aspect of the present invention, a method is provided for generating an index for storing data. Manufacturing data relating to a first work piece is received. A failure pattern associated with the data relating to the first work piece is determined. The data relating to the first work piece is stored using an index. Manufacturing data relating to a work piece is received. A determination is made as to whether the failure pattern associated with the data relating to the second work piece corresponds to the failure pattern associated with the data relating to the first work piece. The index for the manufacturing data relating with the first work piece is associated with the data relating to the second work piece. The association is based upon a determination that the failure pattern associated with the second work piece corresponds to the failure pattern associated with the first work piece, thereby equating the data relating to the first work piece and the data relating to the second work piece.

In another aspect of the present invention, a system is provided for generating an index for storing data. The system includes a processing tool to process a work piece and a measurement tool to acquire manufacturing data relating to the work piece. The manufacturing data comprises at least one of a metrology data and a test data indicative of a failure pattern. The system also includes a controller to determine a failure pattern associated with a first portion of the work piece and a failure pattern associated with a second portion of the work piece. The controller is also adapted to determine whether a failure pattern associated with the second portion of the work piece corresponds to the failure pattern associated with the first portion of the work piece. The controller is also adapted to associate an index for data relating to the failure pattern associated with first portion of the work piece to data relating to the failure pattern associated with the second portion based upon a determination that the failure pattern is associated with the second portion of the work piece.

In another aspect of the present invention, an apparatus is provided for generating an index for storing data. The apparatus includes means for determining a pattern associated with a first set of data; means for storing the first set of data; means for determining whether the pattern associated with a second set of data corresponds to the pattern associated with the first set of data; and means for correlating an index associated with the first set of data, to the second set of data in response to determining that the pattern associated with the second set of data corresponds to the pattern associated with the first set of data In yet another aspect of the present invention, a computer readable program storage device encoded with instructions is provided for generating an index for storing data. The computer readable program storage device is encoded with instructions that, when executed by a computer, performs a method, comprising: determining a pattern associated with a first set of data; storing the first set of data; determining whether the pattern associated with a second set of data corresponds to the pattern associated with the first set of data; and correlating an index associated with the first set of data, to the second set of data in response to determining that the pattern associated with the second set of data corresponds to the pattern associated with the first set of data.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will, of course, be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but may nevertheless be a routine undertaking for those of ordinary skill in the art having the benefit of this disclosure.

The present invention will now be described with reference to the attached figures. Various structures, computers, process tools, and systems are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Portions of the invention and corresponding detailed description are presented in terms of software, or algorithms, and symbolic representations of operations on data bits within a computer memory. These descriptions and representations are the ones by which those of ordinary skill in the art effectively convey the substance of their work to others of ordinary skill in the art. An algorithm, as the term is used herein, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

There are many discrete processes that are involved in semiconductor manufacturing. Many times, work pieces (e.g., semiconductor wafers 105, semiconductor devices, integrated circuits, etc.) are stepped through multiple manufacturing process tools. Embodiments of the present invention provide for organizing and storing failure data in an efficient manner to reduce the complexity and/or the size of databases used to store manufacturing data. Failure data, such as a failure bit map relating to memory arrays, may be organized in accordance with a specific failure pattern. Generally, when portions of a wafer contain errors, an error pattern may be recognized. This error pattern may be repeated in subsequently processed portions of the wafer, or in portions of other wafers. Based upon this pattern, failure data may be organized. The organized failure data may then be indexed. Therefore, in one embodiment, the failure pattern data may be stored in a database according to an indexing system. A relational database may then be organized to store the indexes that refer to the data relating to the failure patterns. Therefore, when a failure pattern is recognized, the index may be used to look up the actual failure data that was stored. In this manner, the number of times a particular failure pattern is stored is significantly reduced, commonly to once per occurrence. Therefore, additional failure patterns that are recognized and correlated with a previously stored failure pattern, need not be stored, saving storage space and other computing resources. Accordingly, an efficient manner of storing and retrieving failure data is provided by embodiments of the present invention.

Embodiments of the present invention provide for acquiring metrology and/or testing data and detecting a pattern relating to the data. The pattern may include error patterns relating to particular die region(s) on a wafer or to memory locations in a memory array. Subsequently acquired metrology data/testing data may then be analyzed and matched up to previously detected error patterns. The data relating to the error patterns may be indexed according to the error patterns. A relational database may be used to store the index data. Upon subsequently encountering another similar error pattern, the index data may be acquired from the relational database. This acquisition may be performed by searching through a list of indexes in the relational database. The index data may be used to point to the previously stored metrology/ test data that corresponds to the error pattern. In other words, the matching index may be also associated or correlated with the newly acquired data, as well as to the originally stored data. In this manner, smaller amounts of data may be stored by storing one set of actual metrology/test data that relates to a particular error pattern and indexing that data into a relational-type database for performing subsequent look up. In this manner, each data set relating to similar error patterns need not be stored, thereby increasing efficiency in the analysis of metrology/test data and reducing the need for excessive computer resources.

Figure 3:
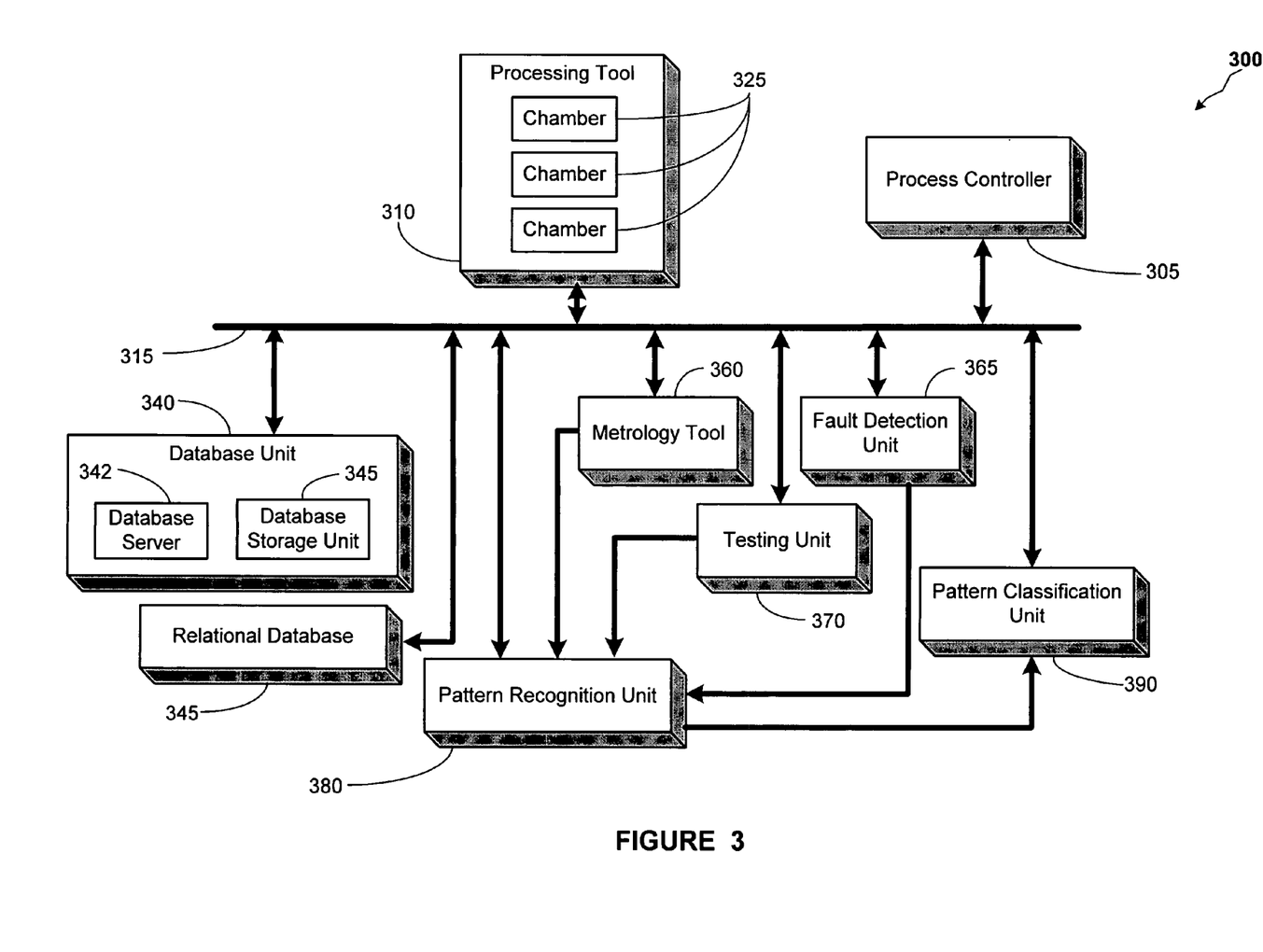
FIG. 3 depicts a block diagram of a system, in accordance with one illustrative embodiment of the present invention.

Turning now to FIG. 3, a system 300 in accordance with embodiments of the present invention is illustrated. A process controller 305 in the system 300 is capable of controlling various operations relating to a plurality of processing tools 310. The process controller 305 is also capable of performing feedback and/or feed-forward connections based upon retrieved data relating to failure patterns. The processing tools 310 may comprise a plurality of chambers 325, each of which may process wafers. The system 300 is also capable of acquiring manufacturing data, such as metrology data related to processed semiconductor wafers 105, testing data, performance data, yield data, etc. The system 300 may also comprise a plurality of metrology tools 360 to acquire various types of metrology data relating to the processed semiconductor wafers 105. The system 300 may also comprise a testing unit 370. The testing unit 370 may comprise one or more testing devices that are capable of testing wafers, die regions on a wafer, memory locations in a memory array, integrated circuitry, etc.

The system 300 may also comprise a fault detection unit 365. The fault detection unit 365 may be capable of performing analysis of the various manufacturing data to detect a fault associated with a portion of a processed wafer. Various types of data analysis techniques may be employed by the fault detection unit 365. For example, statistical calculations, threshold comparisons, model-data comparisons, etc., may be used by the fault detection unit 365 to detect a fault condition associated with a portion of a processed wafer.

The system 300 may also comprise a database unit 340. The database unit 340 is provided for storing a plurality of types of data, such as manufacturing-related data, data related to the operation of the system 300 (e.g., the status of the processing tool 310, the status of semiconductor wafers 105, etc.). The manufacturing data may include metrology data, testing data, such as data relating to wafer electrical tests (WET), memory array-read/write tests, etc. The database unit 340 may store tool state data relating to a plurality of process runs performed by the processing tool 310. The database unit 340 may comprise a database server 342 for storing tool state data and/or other manufacturing data related to processing of wafers, into a database storage unit 345.

Further, the system 300 may also comprise a relational database 345. Index data relating to the manufacturing data may be stored in the relational database 345. In one embodiment, when the process controller 305 receives an indication that a particular error pattern has been detected, the controller 305 may scan the relational database 345 to search for an index that corresponds to the error pattern. Using the index, actual data relating to the error pattern may then be retrieved from the database unit 340. If an index that matches the detected error pattern has not been found, the process controller 305 may generate a new index and store the corresponding error pattern data. In one embodiment, the relational database 345 may be a separate database entity from the database unit 340. In an alternative embodiment, the relational database 345 may be a part of the database unit 340.

The system 300 also comprises a pattern analyzer unit 380. The pattern analyzer unit 380 is capable of analyzing data from a metrology tool 350, the fault detection unit 360, and/or the testing element 370. Based upon the testing data, metrology data, and/or fault detection data, the pattern analyzer unit 380 may determine a particular error pattern. The error pattern may relate to various geometric patterns on a wafer, such as errors across a row in a memory array, certain regions of a die with a consistent error pattern, errors in certain die regions that are common across several wafers in a lot, etc.

The system 300 may also comprise a pattern classification unit 390. The pattern classification unit 390 is capable of performing an analysis and classification of the error patterns that are detected by the pattern analyzer unit 380. The pattern classification unit 390 is capable of deciphering particular error pattern types, such as specific pattern of errors in a row of a memory array, die of a wafer, etc. Based on the pattern detection and pattern classification performed by the system 300, an index for to the data relating to a particular error pattern may be generated. The data may then be stored using an index relationship, wherein the index data is stored in the relational database 345. In this manner, a subsequent detection of a particular error pattern may then be indexed by the system 300 and associated with a previously stored set of data. Therefore, using the association of particular datasets to indexed error patterns, a significantly lesser amount of data is required to be stored.

The process controller 305, the fault detection unit 365, the pattern analyzer unit 380, and/or the pattern classification unit 390 may comprise software components, hardware components, firmware components, and/or a combination thereof. Furthermore, the various components represented by the blocks illustrated in FIG. 3 may communicate with one another via a system communications line 315. The system communications line 315 may be a computer bus link, a dedicated hardware communications link, a telephone system communications link, a wireless communications link, or other communication links that may be implemented by those skilled in the art having benefit of the present disclosure.

Figure 4:
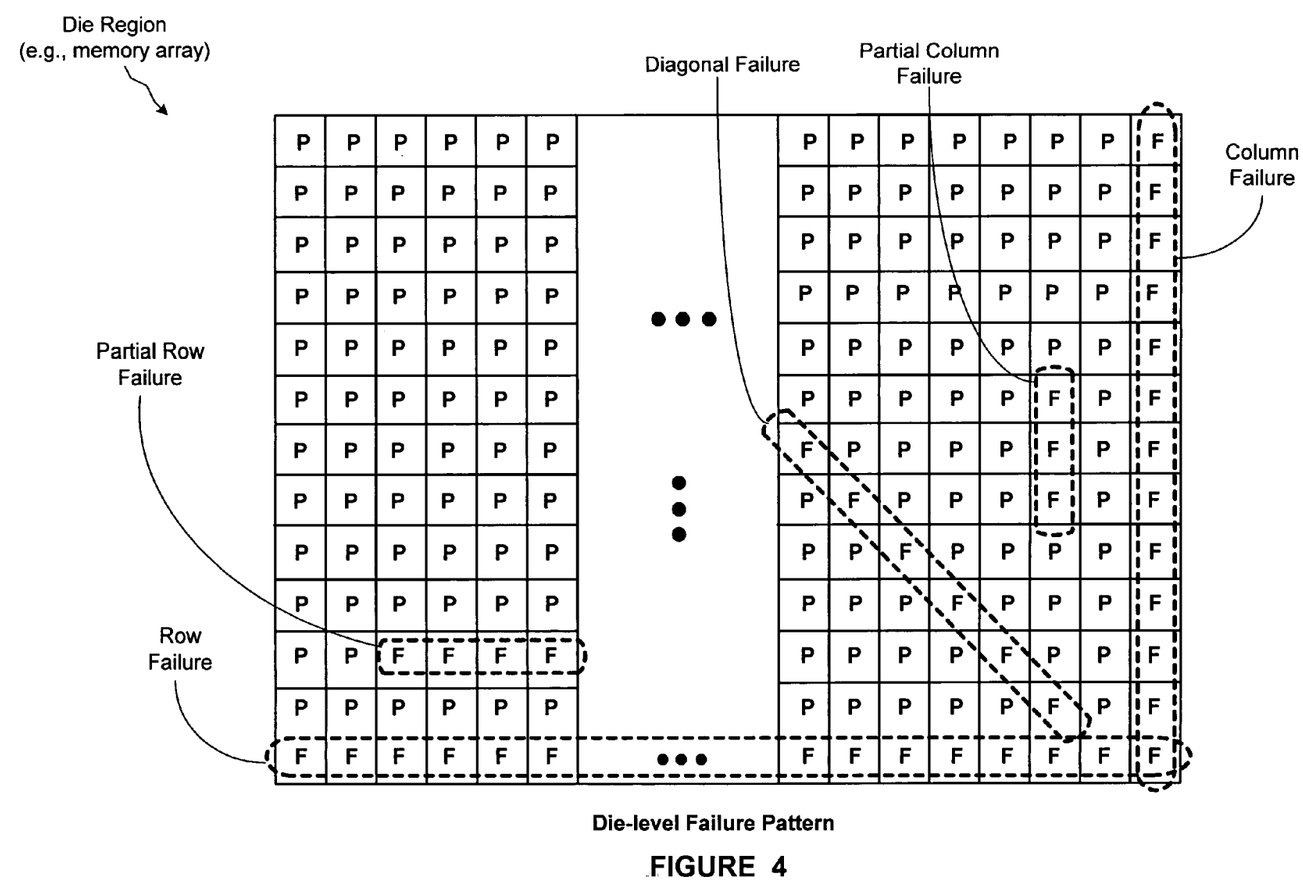
FIG. 4 illustrates a stylized, die level depiction of a plurality of failure patterns, in accordance with one illustrative embodiment of the present invention.

Turning now to FIG. 4, a stylized, exemplary layout of a die region, such as a memory array region in a wafer, is illustrated. FIG. 4 illustrates a die level test result, indicating a passing (P) region or a failing (F) region within an area of a wafer being processed. Various tests, such as electrical tests, memory read back tests, metrology analysis, etc., may be performed to analyze a die region. As illustrated in FIG. 4, a pattern that includes three vertically positioned failing (F) sections may represent a partial column failure. This particular partial column failure pattern may be repeated in corresponding regions of other die areas on a wafer. Another exemplary pattern may include a diagonally patterned failing (F) region. Further, a failure pattern for a partial row may also be detected. Further, an entire column or an entire row may fail, as illustrated in FIG. 4. Therefore, various failure patterns based on various tests, such as memory read-write tests, electrical tests, metrology analysis, etc., may be detected in the various regions of a die and failure patterns may be established. The pattern analyzer unit 380 is capable of detecting the various patterns illustrated in FIG. 4, such as the diagonal pattern, partial column pattern, partial row pattern, column pattern, row pattern, etc., and associating the failures to a particular pattern. These patterns may then be classified by the pattern classification unit 390. Using this classification, the failure data may be indexed and stored. The actual failure data may be only stored once, wherein each index relating to the failure patterns may be stored. The subsequently detected failure patterns may then be indexed and referenced to the corresponding previously stored error data.

Figure 5:
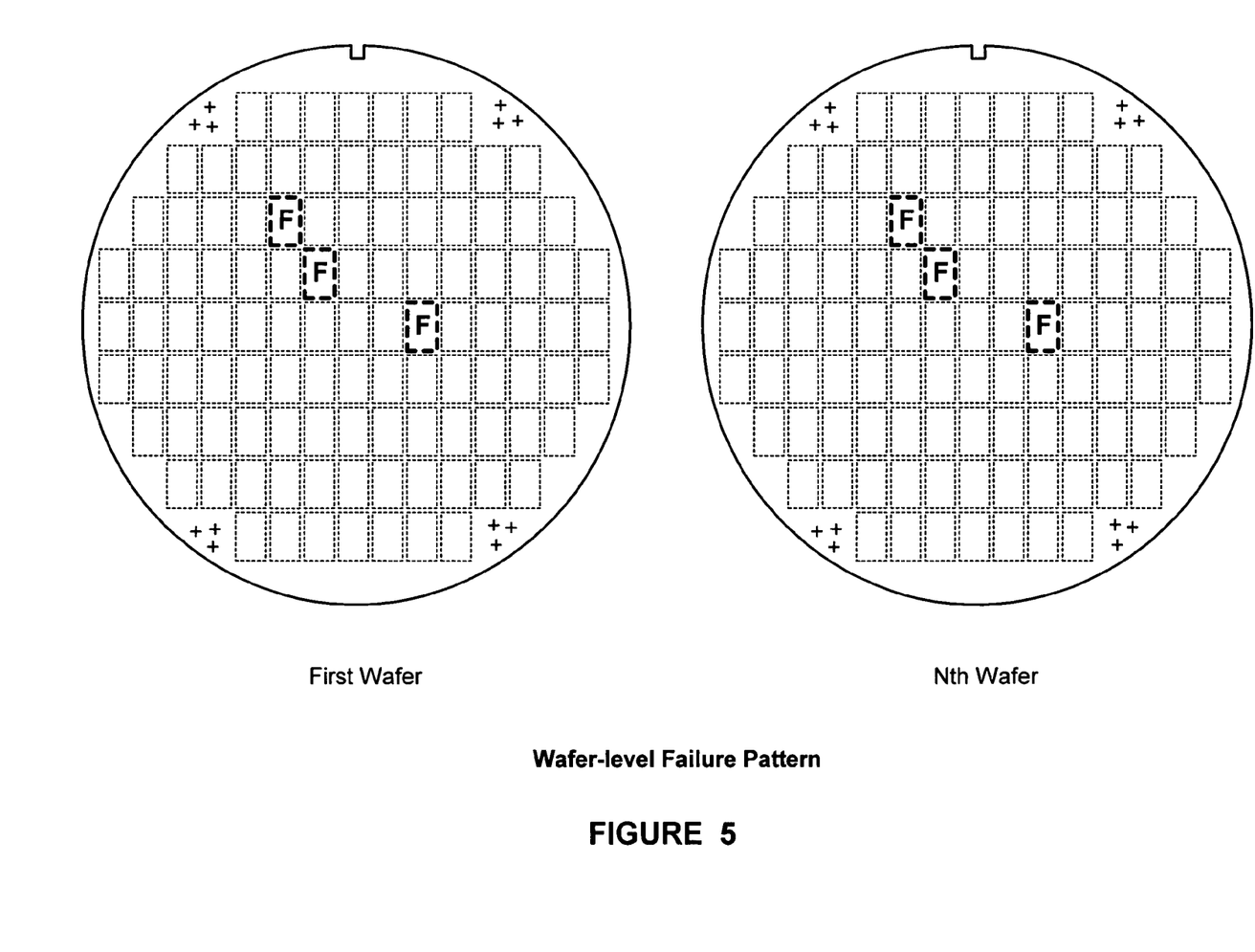
FIG. 5 illustrates a stylized, wafer level depiction of a failure pattern, in accordance with one illustrative embodiment of the present invention.

Turning now to FIG. 5, a stylized wafer-level failure pattern depiction in accordance with one embodiment of the present invention, is illustrated. FIG. 5 illustrates a first wafer and an $N^{th}$ wafer (where N is any integer). A failure in specific regions of the wafer may be recognized and a failure pattern may be established. These failure patterns may be repeated in various wafers, such as the first and the $N^{th}$ wafers. Therefore, if data relating to the failures on the first wafer is indexed and stored, upon detection of the failures in the $N^{th}$ wafer, an indexing reference may be used to extract the data relating to the failures in the first wafer. This data may also be applicable to the failures of the $N^{th}$ wafer. Therefore, to store details relating to the failures of the $N^{th}$ wafer, only a reference index that points to the previously stored data from the first wafer need be saved, thereby saving considerable computing resources.

Figure 6:
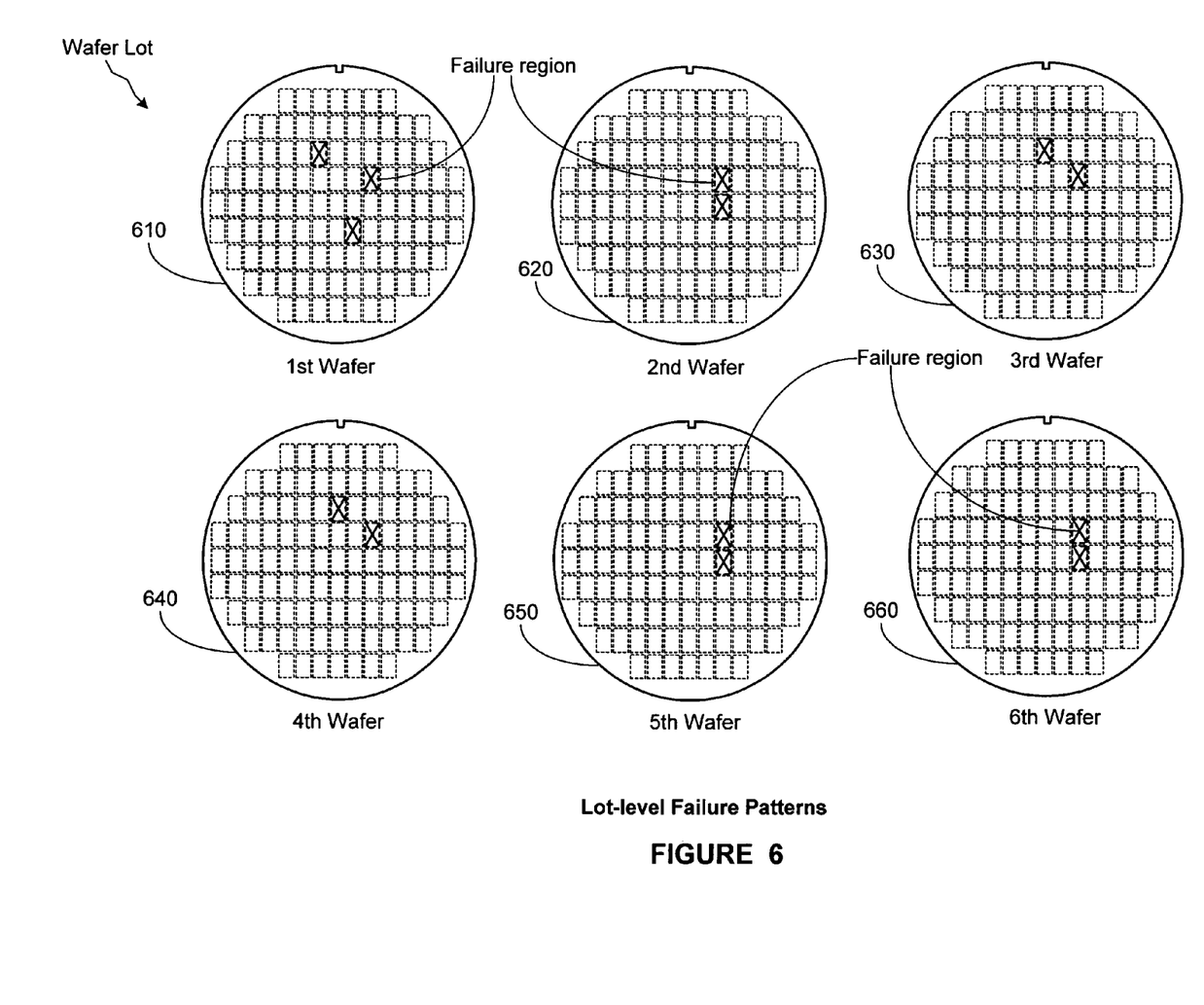
FIG. 6 illustrates a stylized, lot level depiction of a failure pattern, in accordance with one illustrative embodiment of the present invention.

Turning now to FIG. 6, a lot-level failure pattern relating to a plurality of wafers on a lot, is illustrated. FIG. 6 illustrates a plurality of wafers ($1^{st}$ through $6^{th}$ wafers 610, 620, 630, 640, 650, 660) that may each contain a failure region that is common across the some of the illustrated wafers. For example, the $3^{rd}$ and $4^{th}$ wafers 630, 640 may contain similar failure patterns. Similarly, the $2^{nd}$, $5^{th}$, and $6^{th}$ wafers 620, 650, 660 may contain similar failure patterns. Therefore, a failure pattern on a lot level basis may be established. The coordinates of the failure may be used to index the failure data relating to a group of wafers with similar failure patterns. Upon encountering similar failures on other wafers, instead of storing various details of the errors itself, an index may be stored pointing to the error data relating to previously stored data. Therefore, a lot level indexing scheme may be provided where only certain number of errors data sets are stored. This provides for storage of failure data from one wafer, and upon encountering a similarly situated error pattern on another wafer, the data relating to the original wafer may be used as if it were data relating to the second wafer.

In this manner, one index may refer to a single set of data that corresponds to data relating to the $3^{rd}$ and $4^{th}$ wafers 630, 640, while a second index may refer to a single set of data that corresponds to data relating to $2^{nd}$, $5^{th}$, and $6^{th}$ wafers 620, 650, 660. The data relating to the $1^{st}$ wafer 610, which contains a failure pattern that is dissimilar to the failure patterns of all other wafers in the lot may be assigned its own unique index. In this way, considerable computing resources may be efficiently saved while still maintaining error data integrity.

Figure 7A:
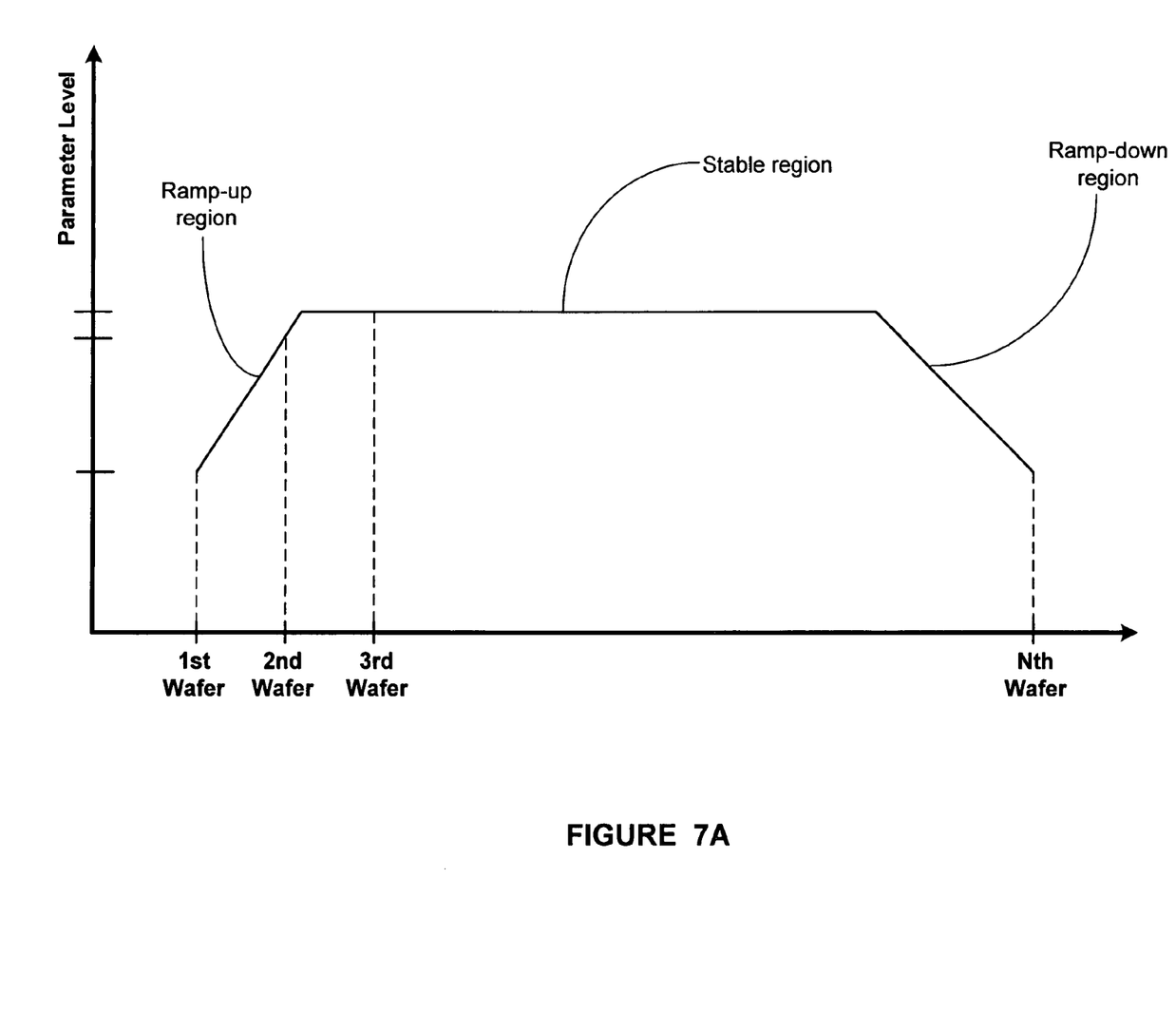
FIG. 7A illustrates a stylized graph of a manufacturing parameter across a number of wafers being processed, in accordance with one illustrative embodiment of the present invention.

Turning now to FIG. 7A, a parameter level diagram relating to particular wafers in a lot is illustrated. Various process control parameters may be mapped across a plurality of wafers. Examples of such parameters may include a power curve of an etcher, down-pressure on a polish plate, spin speed on a dispense cup, illumination power of a photolithography process, and the like. Other parameters relating to a processing of a particular wafer may include the RF curve relating to an etch process, gas-flow rates, and the like. As an example, the power curve of an etcher may be mapped across various wafers. As an example, when several wafers are being processed one after the other, the wafer power may ramp up, as indicated by the ramp-up portion in FIG. 7A. The wafer power may then reach a period of stability, as indicated by the stable region in FIG. 7A. Subsequently, after processing a certain number of wafers, the wafer power curve may ramp down. Therefore, a parameter level pattern may be established across a plurality of wafers. This pattern may be similar from one lot to another. Hence, instead of storing all of the parameter data points relating to various lots, the data points of the power curve of one lot may be stored and a wafer power curve pattern for other lots may be indexed and referenced back to the actual data relating to the first lot that was stored. The various slope-patterns of the power curve may be indexed with an acceptable degree of precision. Similarly, other parameters may also be mapped in a similar fashion. The power curve illustration of FIG. 7A may also be applied to various parameters relating to various die regions, within a single wafer, and/or across a wafer lot.

Figure 7B:
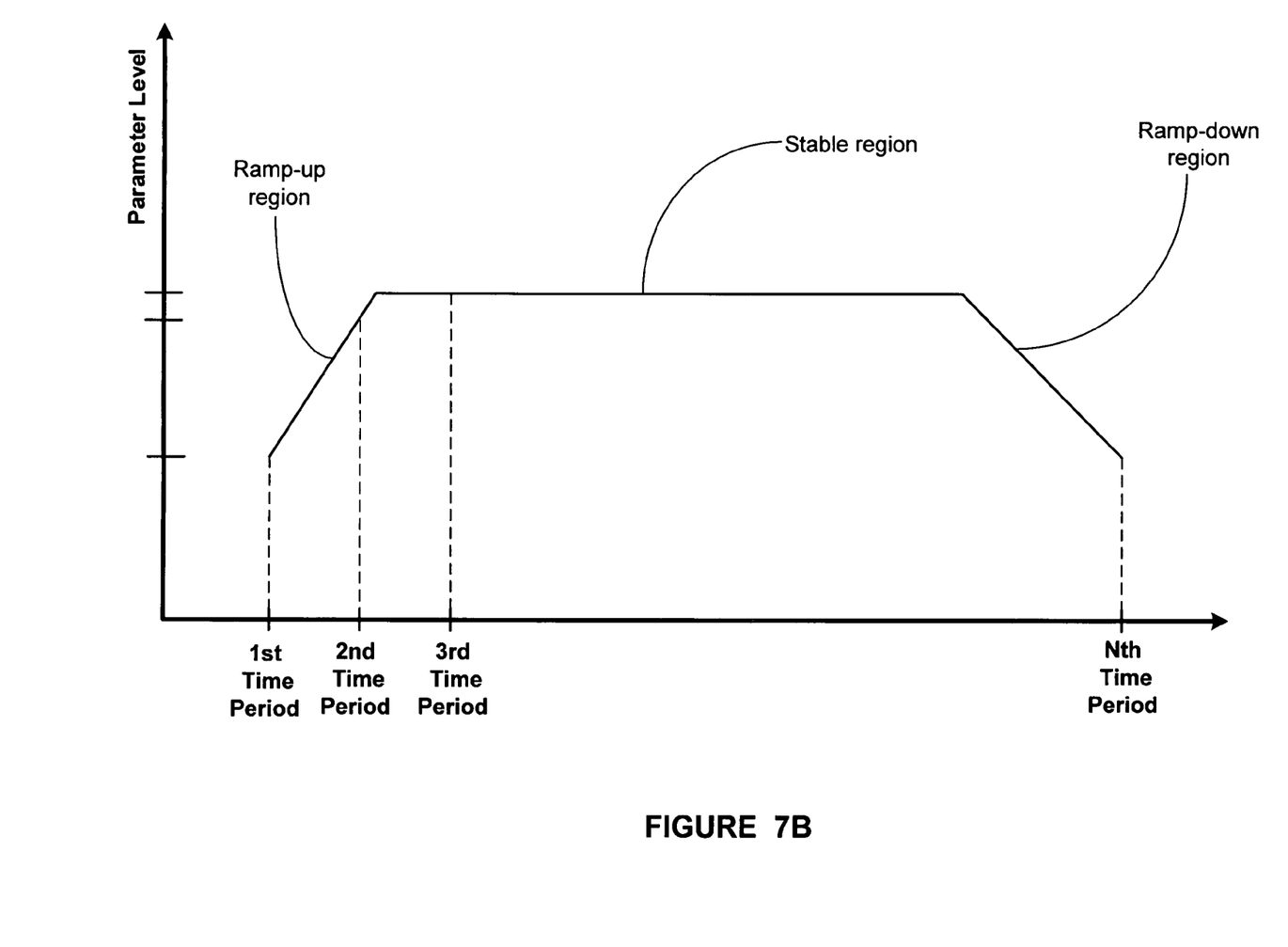
FIG. 7B illustrates a stylized graph of a manufacturing parameter across an amount of time, in accordance with one illustrative embodiment of the present invention.

Turning now to FIG. 7B, a parameter level diagram relating to particular regions on a wafer in relation to various time periods, is illustrated. As an example, the power curve of an etcher may be tracked along various time periods when processing a semiconductor wafer 105. For example, when regions of a wafer are being processed one after the other, the wafer power may ramp up, as indicated by the ramp-up portion in FIG. 7. The wafer power may then reach a period of stability for a certain amount of time, as indicated by the stable region in FIG. 7B. Subsequently, after a certain time period, the wafer power curve may ramp down. Therefore, a parameter level pattern may be established across a plurality of regions across a wafer or across a plurality of wafers in a lot.

Figure 8:
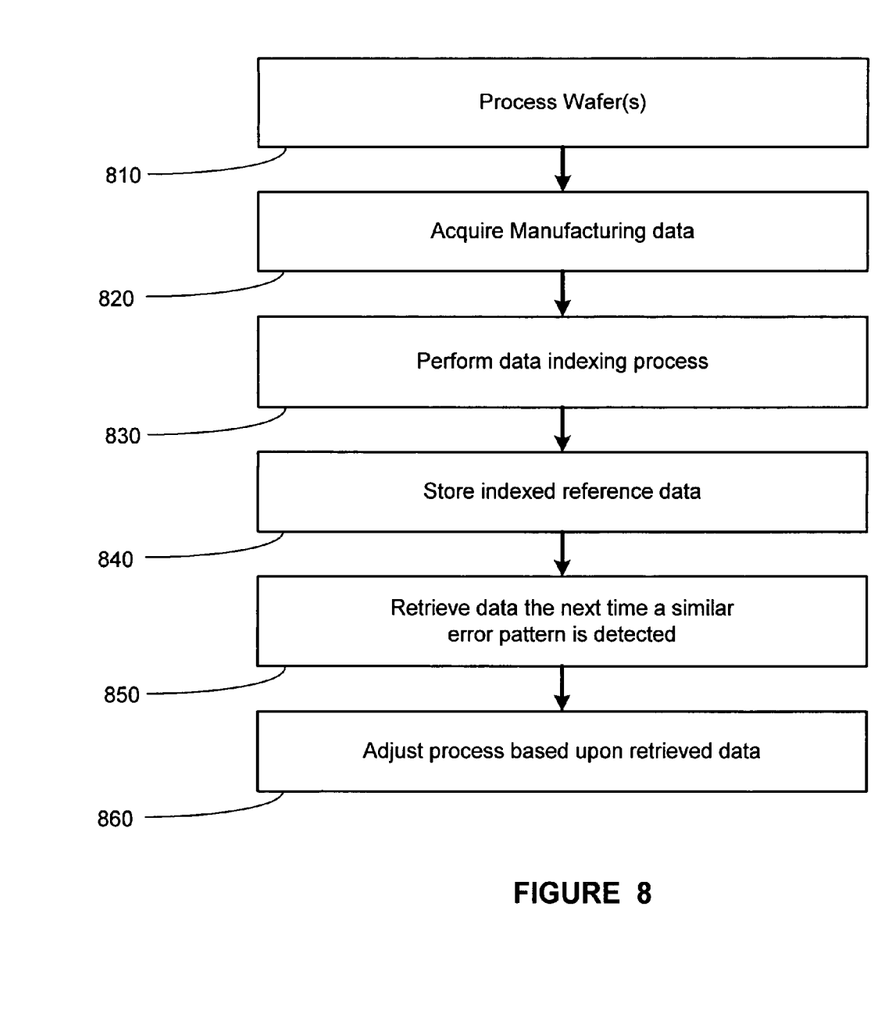
FIG. 8 illustrates a flowchart depiction of one embodiment of the steps of the method, in accordance with one illustrative embodiment of the present invention.

Turning now to FIG. 8, a flowchart depiction of the method in accordance with one illustrative embodiment of the present invention is provided. The system 300 may process a plurality of semiconductor wafers (block 810). Based upon processing of the wafers, metrology/test data may be acquired (block 820). The system 300 may then perform a data indexing process based upon the metrology or test data that is acquired (block 830). The data indexing process provides for performing pattern recognition and pattern classification of the acquired metrology/test data. More detailed description of the data indexing process of block 830 is provided in FIG. 9 and accompanying description below.

Upon performing the data indexing process, the system 300 may store the indexed reference data (block 840). The stored indexed data may then be retrieved at a subsequent time period when a similar error pattern is detected (block 850). Therefore, manufacturing data relating to similar error patterns may be detected, deciphered, and indexed and may then be substituted for another error pattern. Based upon this data, an adjustment to the process may then be performed (block 860). Therefore, lesser amount of data need be stored while providing detailed error data for a plurality of wafers being analyzed.

Figure 9:
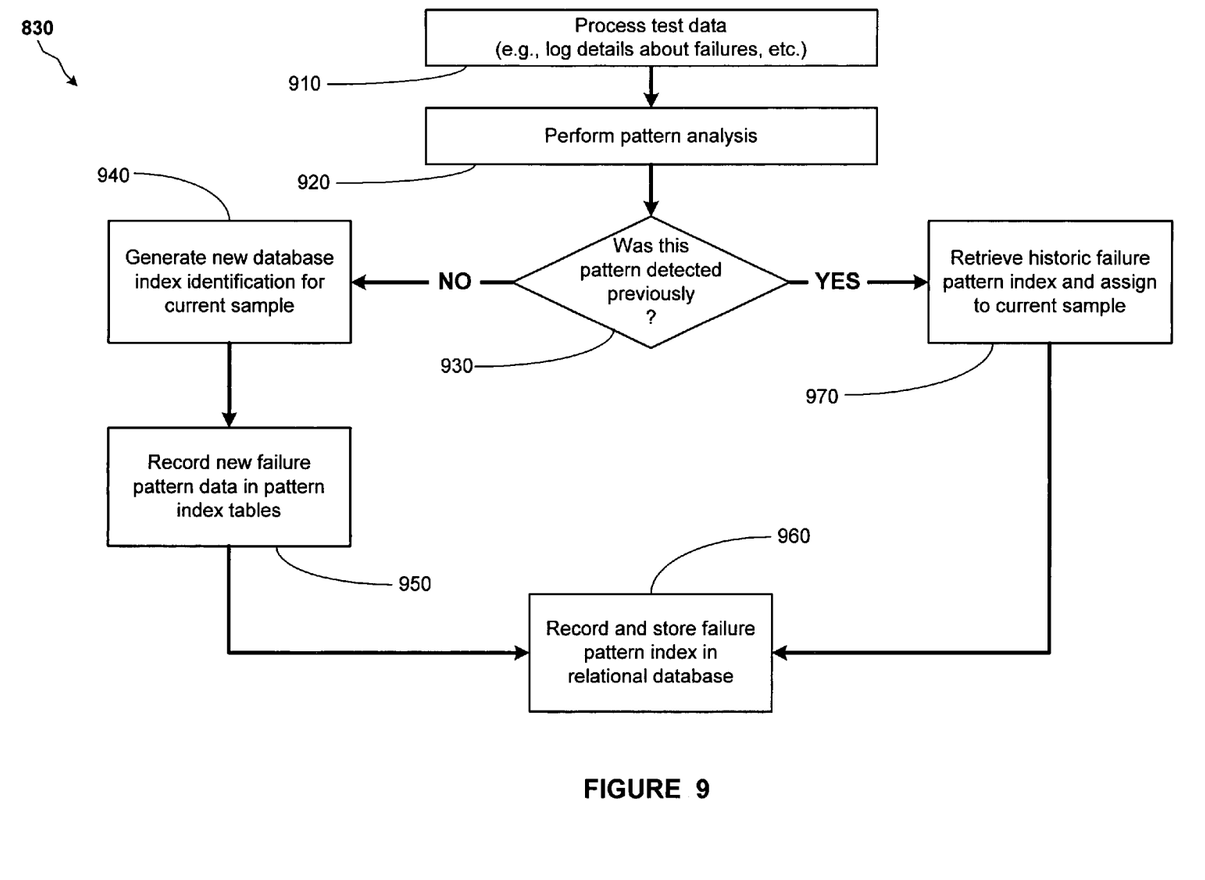
FIG. 9 illustrates a more detailed flowchart depiction of performing the data indexing process of FIG. 8, in accordance with one illustrative embodiment of the present invention.

Turning now to FIG. 9, a more detailed flowchart depiction of the steps for performing the data indexing process of block 830 of FIG. 8, is illustrated. The system 300 may process test data and/or metrology data that is acquired (block 910). This process may include logging details about the failure, location of the failure, severity of the failure, etc. The process test/metrology data may then be used to perform a pattern analysis (block 920). The pattern analysis may include detecting a particular type of pattern relating to the failure/errors. For example, this process may include determining whether a particular portion of a column that corresponds respectively across a number of wafers contains a failure pattern.

The system 300 may then make a determination whether the pattern that is detected has been previously detected (block 930). Upon a determination that the pattern has not been previously detected, the system 300 may generate a new database index identification for the newly discovered failure pattern and assign it to the current sample (block 940). Based upon the new database index, the detailed data relating to the new failure pattern may be stored in a pattern index table (block 950). The pattern index table may comprise data relating to various patterns that were sorted and indexed according to a particular pattern relating to the failures. Upon recording the new failure pattern, the corresponding index in relation to the stored database data is recorded and stored, i.e., the failure pattern to be used as a reference index is stored (block 960). Therefore, upon creating a new database index identification, the new failure pattern data in the pattern is stored into an index table and the failure pattern index itself is stored for further retrieval of the actual corresponding data.

When a determination is made that the detected pattern based upon performing the pattern analysis, has been previously detected (block 930), the system 300 may then retrieve the historical failure pattern index as assign it to the current sample (block 970). In other words, if a previously detected failure pattern matches a newly discovered failure pattern, the failure pattern index is retrieved. Further, the system 300 may then record and store the failure pattern index in a relational database (block 960). The system 300 does not necessarily store the actual data relating to the recognized failure pattern. Instead, the previously stored detailed error data may be substituted for the presently discovered failures based upon the determination that the index of the failures matches a particular stored failure pattern. In this manner, various error data details are stored and retrieved based upon indexing features; for example, using a relational database to index the failure data to actually look up stored manufacturing data.

Utilizing embodiments of the present invention, massive amounts of data storage requirements may be reduced while maintaining adequate record of failure patterns substantially without sacrificing data integrity. Embodiments of the present invention provide for acquiring various electrical/metrology data relating to a portion of a wafer being processed. The present invention provides for indexing the wafer failure data based on pattern recognition techniques. Failure patterns may be repeated on several wafers. Data relating to the failure pattern may be indexed and stored. Subsequent detection of similar error patterns may result in generating for additional indexes that point to the original stored set of data. Therefore, the indexing function may be used to acquire the data stored in relation to the first failure pattern. The data from the database generally coincides with subsequently detected failure patterns. Therefore, large amounts of error data may be provided using the reference indexes that are based on failure patterns without having to store data associated with every failure pattern, reducing the amount of computing resource requirements. Hence, faster access to wafer data may be provided while requiring relatively limited computer resources. Embodiments of the present invention provide for increased efficiency in acquiring, storing, and/or retrieving manufacturing data, thereby affecting the process output.

The principles taught by the present invention can be implemented in an Advanced Process Control (APC) Framework. The APC framework is a preferred platform from which to implement the control strategy taught by the present invention. In some embodiments, the APC framework can be a factory-wide software system; therefore, the control strategies taught by the present invention can be applied to virtually any of the semiconductor manufacturing tools on the factory floor. The APC framework also allows for remote access and monitoring of the process performance. Furthermore, by utilizing the APC framework, data storage can be more convenient, more flexible, and less expensive than local drives. The APC framework allows for more sophisticated types of control because it provides a significant amount of flexibility in writing the necessary software code.

Deployment of the control strategy taught by the present invention onto the APC framework could require a number of software components. In addition to components within the APC framework, a computer script is written for each of the semiconductor manufacturing tools involved in the control system. When a semiconductor manufacturing tool in the control system is started in the semiconductor manufacturing fab, it generally calls upon a script to initiate the action that is required by the process controller, such as the overlay controller. The control methods are generally defined and performed in these scripts. The development of these scripts can comprise a significant portion of the development of a control system. The principles taught by the present invention can be implemented into other types of manufacturing frameworks.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   determining an error pattern associated with a first set of data, said first set of data relating to post-process data;
   storing said first set of data in a first database;
   determining whether the error pattern associated with a second set of data corresponds to the pattern associated with said first set of data;
   correlating an index associated with said first set of data, to said second set of data in response to determining that said pattern associated with said second set of data corresponds to the pattern associated with said first set of data; and
   storing said index in a relational database, wherein said index may be used to associate said second set of data with said first set of data, in said first database; and
   providing said first set of data as an equivalent of said second set of data based upon said index.

2. The method of claim 1, further comprising processing a subsequent work piece based upon analysis of said second set of data.

3. The method of claim 1, further comprising:
   receiving a request for accessing said second set of data; and
   providing said first set of data as an equivalent of said second set of data based upon said index in response to said request.

4. The method of claim 1, wherein determining a pattern associated with said first set of data comprises determining a failure pattern associated with at least a portion of a semiconductor wafer.

5. The method of claim 4, wherein determining whether the pattern associated with said second set of data corresponds to the pattern associated with said first set of data comprises determining whether a failure pattern associated with at least a portion of a semiconductor wafer is substantially similar to said failure pattern associated with said first set of data.

6. The method of claim 5, farther comprising generating a new index for said second set of data in response to determining that said pattern associated with said second set of data does not correspond to the pattern associated with said first set of data.

7. The method of claim 1, wherein determining said pattern associated with a first set of data comprises determining a first bit pattern map relating to a portion of a memory based upon a test.

8. The method of claim 7, wherein determining whether said pattern associated with said second set of data corresponds to the pattern associated with said first set of data comprises determining whether said pattern associated with a second bit pattern map is substantially similar to said first bit pattern map.

9. The method of claim 8, further comprising using said index to point to said first bit pattern map when a request to access said second bit map is received.

10. The method of claim 1, wherein associating said second set of data with said first set of data in said first database comprises providing one set of data that represents both said first set of data and said second set of data.

11. An apparatus, comprising:
    means for determining an error pattern associated with a first set of data, said first set of data relating to post-process data;
    means for storing said first set of data in a first database;
    means for determining whether the error pattern associated with a second set of data corresponds to the pattern associated with said first set of data;
    means for correlating an index associated with said first set of data, to said second set of data in response to determining that said pattern associated with said second set of data corresponds to the pattern associated with said first set of data;
    means for storing said index in a relational database, wherein said index may be used to associate said second set of data with said first set of data, in said first database; and
    means for providing said first set of data as an equivalent of said second set of data based upon said index.

12. A method, comprising:
- receiving manufacturing data relating to a first portion of a work piece, said manufacturing data relating to post-process data;
- determining a failure pattern associated with said data relating to said first portion of said work piece;
- storing said data relating to said first portion of said work piece in a first database;
- providing an index associated with said data relating to said first portion of said work piece;
- receiving manufacturing data relating to a second portion of said work piece;
- determining whether the failure pattern associated with said data relating to said second portion of said work piece corresponds to the failure pattern associated with said data relating to said first portion of said work piece;
- associating said index relating to said data relating to said second portion of said work piece to said data relating to said first portion of said work piece based upon a determination that the failure pattern associated with said second portion of said work piece corresponds to the failure pattern associated with said first portion of said work piece;
- storing said index in a relational database, wherein said index may be used to associate the data relating to said second portion with the data relating to said first portion, in said first database; and
- providing said data relating to said first portion as an equivalent of said data relating to the second portion based upon said index.

13. The method of claim 12, further comprising processing a subsequent work piece based upon an analysis of at least one of said data relating to said first portion of said work piece and data relating to said second portion of said work piece.

14. The method of claim 12, wherein receiving manufacturing data comprises receiving at least one of a metrology data and a test results data.

15. A method, comprising:
- receiving manufacturing data relating to a first work piece;
- determining a failure pattern associated with said manufacturing data relating to said first work piece;
- storing said manufacturing data relating to said first work piece using an index;
- receiving manufacturing data relating to a second work piece;
- determining whether the failure pattern associated with said manufacturing data relating to said second work piece corresponds to the failure pattern associated with said first work piece;
- associating said index for said manufacturing data relating to said first work piece, with said data relating to said second work piece based upon a determination that the failure pattern associated with said second work piece corresponds to the failure pattern associated with said first work piece, thereby equating said data relating to said first work piece and said data relating to said data relating second work piece; and
- storing said index in a relational database, wherein said index may be used to associate said manufacturing data relating to said second work piece to said manufacturing data relating to said first work piece, in said first database; and
- providing said manufacturing data relating to said first work piece as an equivalent of said manufacturing data relating to said second work piece based upon said index.

16. The method of claim 15, further comprising storing said first set of data in a first database and storing said index in a relational database associated with said first database.

17. The method of claim 16, further comprising processing a third work piece based upon an analysis of at least one of said data relating to said first work piece and data relating to said second work piece.

18. The method of claim 17, wherein receiving manufacturing data comprises receiving at least one of a metrology data, a wafer electrical test (WET) data, and a memory test data.

19. The method of claim 15, wherein determining said failure pattern associated with said manufacturing data relating to at least one of said first work piece and said second work piece comprises determining at least one memory bit map.

20. The method of claim 15, wherein associating said index for said manufacturing data relating to said first work piece, with said data relating to said second work piece comprises searching though a list of a plurality of indexes to match one of said plurality of indexes to said data relating to said second work piece.

21. The method of claim 15, wherein associating said manufacturing data relating to said second work piece to said manufacturing data relating to said first work piece comprises providing one set of data that represents both said manufacturing data relating to said first work piece and said manufacturing data relating to said second work piece.

22. A system, comprising:
- a processing tool to process a work piece;
- a measurement tool to acquire manufacturing data relating to said work piece, said manufacturing data comprising at least one of a metrology data and a test data indicative of a failure pattern;
- a first database;
- a relational database; and
- a controller to determine a failure pattern associated with a first portion of said work piece and a failure pattern associated with a second portion of said work piece, said controller to determine whether a failure pattern associated with said second portion of said work piece corresponds to said failure pattern associated with said first portion of said work piece, and associate an index for data relating to said failure pattern associated with first portion of said work piece, with data relating to said failure pattern associated with said second portion based upon a determination that the failure pattern associated with said second portion of said work piece corresponds to said failure pattern associated with said first portion of said work piece; and
- wherein said index is stored in said relational database, and wherein said controller to use said index to associate data relating to said failure pattern corresponding to said first and second portions of said work piece, in said first database and wherein the controller to provide said failure pattern corresponding to said first portion as an equivalent of the failure patter corresponding to the second portion.

23. The system of claim 22, wherein said processing tool to process a subsequent work piece.

24. The system of claim 22, further comprising:
- a fault detection unit to detect a fault based upon said manufacturing data;
- a pattern analyzer unit to determine a failure pattern associated with manufacturing data; and
- a pattern classification unit to classify said failure pattern to determine whether said failure pattern associated with said second portion of said work piece corresponds to said failure pattern associated with said first portion of said work piece.

25. The system of claim 22, wherein said controller also to perform at least one of a feedback adjustment and a feedforward adjustment to a subsequent process based upon said manufacturing data.

26. The system of claim 22, wherein said work piece is a semiconductor wafer.

27. The system of claim 22, wherein said first and second portion of said work piece comprises memory arrays and wherein said failure pattern associated with at least one of said first portion and said second portion comprises a memory bit map.

28. The system of claim 22, wherein said control to associate data relating to said failure pattern corresponding to said first portion, with said failure pattern corresponding to said second portion, in said first database by providing one set of data that represents both said data relating to failure pattern corresponding to said first portion, and said failure pattern corresponding to said second portion.

29. A computer readable program storage device encoded with instructions that, when executed by a computer, performs a method, comprising:
  determining an error pattern associated with a first set of data, said first set of data relating to post-process data;
  storing said first set of data in a first database;
  determining whether the error pattern associated with a second set of data corresponds to the pattern associated with said first set of data;
  correlating an index associated with said first set of data, to said second set of data in response to determining that said pattern associated with said second set of data corresponds to the pattern associated with said first set of data; and
  storing said index in a relational database, wherein said index may be used to associate said second set of data with said first set of data, in said first database; and
  providing said first set of data as an equivalent of said second set of data based upon said index.

30. The computer readable program storage device encoded with instructions that, when executed by a computer, performs the method of claim 29, further comprising processing a subsequent work piece based upon analysis of said second set of data.

31. The computer readable program storage device encoded with instructions that, when executed by a computer, performs the method of claim 29, wherein said method further comprises:
  receiving a request for accessing said second set of data; and
  providing said first set of data as an equivalent of said second set of data based upon said index in response to said request.

32. The computer readable program storage device encoded with instructions that, when executed by a computer, performs the method of claim 29, wherein determining a pattern associated with said first set of data comprises determining a failure pattern associated with at least a portion of a semiconductor wafer.

33. The computer readable program storage device encoded with instructions that, when executed by a computer, performs the method of claim 29, wherein, associating said second set of data with said first set of data in said first database comprises providing one set of data that represents both said first set of data and said second set of data.

34. A method, comprising:
  determining an error pattern associated with a first set of data, said first set of data relating to processing a first workpiece;
  storing said first set of data in a first database;
  determining whether the error pattern associated with a second set of data corresponds to the pattern associated with said first set of data, said second set of data relating to processing a second workpiece;
  correlating an index associated with said first set of data, to said second set of data in response to determining that said pattern associated with said second set of data corresponds to the pattern associated with said first set of data;
  storing said index in a relational database, wherein said index may be used to associate said second set of data with said first set of data, in said first database; and
  providing said first set of data as an equivalent of said second set of data based upon said index in response to said request in response to receiving a request for accessing the second set of data.

* * * * *